US009026805B2

(12) United States Patent
Acar et al.

(10) Patent No.: US 9,026,805 B2
(45) Date of Patent: May 5, 2015

(54) KEY MANAGEMENT USING TRUSTED PLATFORM MODULES

(75) Inventors: Tolga Acar, Sammamish, WA (US); Brian LaMacchia, Bellevue, WA (US); Henry Jerez Morales, Seattle, WA (US); Lan Duy Nguyen, Bellevue, WA (US); David Robinson, Seattle, WA (US); Talha Bin Tariq, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 12/982,235

(22) Filed: Dec. 30, 2010

(65) Prior Publication Data

US 2012/0173885 A1 Jul. 5, 2012

(51) Int. Cl.
*H04L 9/08* (2006.01)
*G06F 21/60* (2013.01)

(52) U.S. Cl.
CPC ............ *H04L 9/0877* (2013.01); *G06F 21/602* (2013.01)

(58) Field of Classification Search
None
See application file for complete search history.

(56) References Cited

U.S. PATENT DOCUMENTS

| 5,481,613 | A  | 1/1996  | Ford et al.      |
|-----------|----|---------|------------------|
| 5,812,666 | A  | 9/1998  | Baker et al.     |
| 5,956,489 | A  | 9/1999  | San Andres et al.|
| 6,594,671 | B1 | 7/2003  | Aman et al.      |
| 6,711,263 | B1 | 3/2004  | Nordenstam et al.|
| 7,089,211 | B1 | 8/2006  | Trostle et al.   |
| 7,260,224 | B1 | 8/2007  | Ingle et al.     |
| 7,502,927 | B2 | 3/2009  | Trostle et al.   |
| 7,577,258 | B2 | 8/2009  | Wiseman et al.   |
| 7,945,959 | B2 | 5/2011  | Ilechko          |
| 7,957,320 | B2 | 6/2011  | Konig et al.     |
| 7,974,415 | B2 | 7/2011  | Nochta           |
| 7,991,994 | B2 | 8/2011  | Salgado et al.   |
| 7,992,194 | B2 | 8/2011  | Damodaran et al. |
| 8,037,319 | B1 | 10/2011 | Clifford         |
| 8,046,579 | B2 | 10/2011 | Kresina          |
| 8,064,604 | B2 | 11/2011 | Youn             |
| 8,116,456 | B2 | 2/2012  | Thomas           |
| 8,225,690 | B2 | 7/2012  | Shimada et al.   |
| 8,255,690 | B2 | 8/2012  | Wiseman et al.   |
| 8,291,224 | B2 | 10/2012 | Pelton et al.    |
| 8,447,037 | B2 | 5/2013  | Noh et al.       |

(Continued)

OTHER PUBLICATIONS

Trusted Platform Module; http://www.infineon.com/cms/en/product/channel.html?channel=ff80808112ab681d0112ab6921ae011f; Published Date: Nov. 17, 2007.

(Continued)

*Primary Examiner* — Kaveh Abrishamkar
*Assistant Examiner* — Adrian Stoica
(74) *Attorney, Agent, or Firm* — Julie Kane Akhter; Danielle Johnston Holmes; Micky Minhas (57) ABSTRACT

Described herein are techniques for distributed key management (DKM) in cooperation with Trusted Platform Modules (TPMs). The use of TPMs strengthens the storage and processing security surrounding management of distributed keys. DKM-managed secret keys are not persistently stored in clear form. In effect, the TPMs of participating DKM nodes provide security for DKM keys, and a DKM key, once decrypted with a TPM, is available to be used from memory for ordinary cryptographic operations to encrypt and decrypt user data. TPM public keys can be used to determine the set of trusted nodes to which TPM-encrypted secret keys can be distributed.

20 Claims, 7 Drawing Sheets

(56) References Cited

U.S. PATENT DOCUMENTS

| | | |
|---|---|---|
| 8,572,377 B2 | 10/2013 | Kalbratt |
| 2002/0080974 A1 | 6/2002 | Grawrock |
| 2002/0144117 A1 | 10/2002 | Faigle |
| 2003/0110397 A1 | 6/2003 | Supramaniam et al. |
| 2003/0115313 A1 | 6/2003 | Kanada et al. |
| 2003/0126464 A1 | 7/2003 | McDaniel et al. |
| 2003/0154404 A1 | 8/2003 | Beadles et al. |
| 2004/0193917 A1 | 9/2004 | Drews |
| 2005/0097317 A1 | 5/2005 | Trostle et al. |
| 2005/0166051 A1* | 7/2005 | Buer ............... 713/173 |
| 2005/0180572 A1 | 8/2005 | Graunke |
| 2006/0072763 A1 | 4/2006 | You et al. |
| 2006/0136717 A1* | 6/2006 | Buer et al. ............... 713/155 |
| 2006/0147043 A1 | 7/2006 | Mann et al. |
| 2006/0236096 A1 | 10/2006 | Pelton et al. |
| 2006/0236363 A1 | 10/2006 | Heard et al. |
| 2006/0291664 A1 | 12/2006 | Suarez et al. |
| 2007/0039039 A1 | 2/2007 | Gilbert et al. |
| 2007/0094719 A1* | 4/2007 | Scarlata ............... 726/9 |
| 2007/0116269 A1 | 5/2007 | Nochta |
| 2007/0162750 A1 | 7/2007 | Konig et al. |
| 2007/0220591 A1 | 9/2007 | Damodaran et al. |
| 2007/0230706 A1 | 10/2007 | Youn |
| 2007/0258623 A1 | 11/2007 | McGrath et al. |
| 2008/0022370 A1 | 1/2008 | Beedubail et al. |
| 2008/0065884 A1 | 3/2008 | Emeott et al. |
| 2008/0070577 A1 | 3/2008 | Narayanan et al. |
| 2008/0083011 A1 | 4/2008 | McAlister et al. |
| 2008/0130902 A1 | 6/2008 | Foo Kune et al. |
| 2008/0152151 A1 | 6/2008 | Pourzandi et al. |
| 2008/0256646 A1* | 10/2008 | Strom et al. ............ 726/29 |
| 2008/0263370 A1 | 10/2008 | Hammoutene et al. |
| 2008/0271165 A1* | 10/2008 | Schnell et al. ............ 726/30 |
| 2008/0275991 A1* | 11/2008 | Matsuzaki et al. ............ 709/225 |
| 2008/0307054 A1* | 12/2008 | Kamarthy et al. ............ 709/206 |
| 2009/0006862 A1* | 1/2009 | Alkove et al. ............ 713/189 |
| 2009/0025063 A1 | 1/2009 | Thomas |
| 2009/0086979 A1 | 4/2009 | Brutch et al. |
| 2009/0092252 A1 | 4/2009 | Noll et al. |
| 2009/0136043 A1 | 5/2009 | Ramanna et al. |
| 2009/0154709 A1 | 6/2009 | Ellison |
| 2009/0240941 A1* | 9/2009 | Lee et al. ............ 713/169 |
| 2009/0249073 A1* | 10/2009 | Wiseman et al. ............ 713/171 |
| 2009/0254392 A1 | 10/2009 | Zander |
| 2009/0292914 A1 | 11/2009 | Liu et al. |
| 2010/0146295 A1* | 6/2010 | Proudler ............ 713/189 |
| 2010/0211781 A1 | 8/2010 | Auradkar et al. |
| 2010/0217853 A1 | 8/2010 | Alexander et al. |
| 2010/0303240 A1 | 12/2010 | Beachem et al. |
| 2010/0306554 A1 | 12/2010 | Nunez-Tejerina et al. |
| 2010/0313011 A1* | 12/2010 | Laffey ............ 713/155 |
| 2011/0038482 A1 | 2/2011 | Singh et al. |
| 2011/0040960 A1 | 2/2011 | Deierling et al. |
| 2011/0055560 A1* | 3/2011 | Meissner et al. ............ 713/166 |
| 2011/0088087 A1 | 4/2011 | Kalbratt |
| 2011/0103589 A1 | 5/2011 | Tie et al. |
| 2011/0150224 A1 | 6/2011 | Noh et al. |
| 2011/0200026 A1 | 8/2011 | Ji et al. |
| 2011/0243332 A1 | 10/2011 | Akimoto |
| 2012/0300940 A1 | 11/2012 | Sabin et al. |
| 2013/0254529 A1 | 9/2013 | Fu et al. |

OTHER PUBLICATIONS

Hewitt; Trusted Computing and the Trusted Platform Module: What All the Fuss Is About; Published Date: Apr. 13, 2006.

Vaughan-Nichols; Windows 7, Security, and the Trusted Platform Module; http://www.cs.hmc.edu/~mike/public_html/courses/security/s06/projects/bill.pdf; Published Date: Mar. 22, 2010.

Relph-Knight; Linux and the Trusted Platform Module (TPM); http://www.h-online.com/open/features/Linux-and-the-Trusted-Platform-Module-TPM-746611.html; Published Date: Sep. 28, 2009.

Kauer; OSLO: Improving the security of Trusted Computing; http://www.usenix.org/event/sec07/tech/full_papers/kauer/kauer_html/: Published Date: 2007.

McCune et al.; TrustVisor: Efficient TCB Reduction and Attestation; Published Date: Mar. 9, 2009.

Office action for U.S. Appl. No. 13/434,737, mailed on Jan. 16, 2014, Acar, et al., "Role-Based Distributed Key Management", 10 pages.

Acar, et al., "Cryptographic Agility and its Relation to Circular Encryption", Europcrypt 2010, Springer Verlag, May 2010, 25 pages.

Michener, et al., "Security Domains: Key Manaement in Large-Scale Systems", IEEE Software, IEEE Computer Society, vol. 17, No. 5, Sep. 2000, pp. 52-58.

Acar, "Distributed Key Management and Cryptographic Agility", <<http://www.cs.washington.edu/education/courses/csep590a/11wi/slides/UW%20Lecture%2020110224%20-%20Tolga.pdf>>, University of Michigan, 2011, pp. 1-22.

Acar, et al., "Key Management in Distributed Systems", Microsoft, 2010, pp. 1-14.

Adusumilli, et al., "DGKD: Distributed Group Key Distribution with Authentication Capability", IEEE, 2005, pp. 286-293.

Joshi, et al., "Secure, Redundant, and Fully Distributed Key Management Scheme for Mobile Ad Hoc Networks: An Analysis", EURASIP Journal on Wireless Communications and Networking, 2005, pp. 579-589.

Lu, et al., "A Framework for a Distributed Key Management Scheme in Heterogeneous Wireless Sensor Networks", IEEE, vol. 7, No. 2., 2008, pp. 639-647.

Mukherjee, et al., "Distributed key management for dynamic groups in MANETs", Elsevier B.V., 2008, pp. 562-578.

Office action for U.S. Appl. No. 13/434,737, mailed on Aug. 8, 2013, Acar, et al., "Role-Based Distributed Key Management", 10 pages.

Office action for U.S. Appl. No. 13/434,737, mailed on Jun. 18, 2014, Acar et al., "Role-Based Distributed Key Management", 9 pages.

\* cited by examiner

KEY MANAGEMENT USING TRUSTED PLATFORM MODULES

BACKGROUND

Data protection has been provided in numerous ways. Many designs for data protection have involved the encryption of data such as sensitive information, passwords, secrets, and so on. An application programming interface (API) or library may be provided on a computer to handle encryption for applications thereon. A simple API might have functions such as protect() and unprotect() with appropriate parameters for incoming data to be protected or unprotected, outgoing unprotected or protected data, keys, group identifiers, etc. As an example, the Windows (TM) operating system has included the DPAPI (TM) (data protection API), for use by application software.

In response to the need to share secure information among users and to provide group-level data protection and access control, data protection facilities such as DPAPI need to be extended to allow groups of related machines or users to share protected data. Distributed Key Management (DKM) services have been used to allow sharing of keys and other grouping functionality. Specifically, a DKM service might provide cryptographic key management services for secure data sharing for distributed applications (for example, as a supplement to the Windows (TM) DPAPI). Some DKM systems may be specifically designed for data centers and cloud services, as well as customer compute clusters and distributed applications. Moreover, like DPAPI, a DKM service might automatically handle key rollover and expiration for users. Some DKM services may use access control lists (ACLs), for example lists of user network identities, to control access to keys for encrypted data.

While there have been many DKM systems available, such systems have relied on software as the basis for security. That is, encryption, key management, key generation, and so forth, have been performed by operating system code, application code, etc., using general purpose central processing units (CPUs) and memory. Techniques discussed below relate to using a hardware security component known as a Trusted Platform Module (TPM) to provide a hybrid hardware-software approach for software-level distributed key management.

SUMMARY

The following summary is included only to introduce some concepts discussed in the Detailed Description below. This Summary is not comprehensive and is not intended to delineate the scope of the claimed subject matter, which is set forth by the claims presented at the end.

Described herein are techniques for distributed key management (DKM) in cooperation with Trusted Platform Modules (TPMs). The use of TPMs strengthens the storage and processing security surrounding management of distributed keys. DKM-managed secret keys are not persistently stored in clear form. In effect, the TPMs of participating DKM nodes provide security for DKM keys, and a DKM key, once decrypted with a TPM, is available to be used from memory for ordinary cryptographic operations to encrypt and decrypt user data. TPM public keys can be used to determine the set of trusted nodes to which TPM-encrypted secret keys can be distributed.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Embodiments discussed below relate to protecting and distributing secrets in a network environment using hardware-rooted keys for software-level distributed key management. This approach may provide protection above that of a software-only approach, yet may avoid the need for burdensome and costly hardware security modules (HSMs). Some embodiments may provide protection that is superior to software-only protection for protecting secrets against hardware theft and insider attacks. Other embodiments may avoid expenses and administrative overhead associated with hardware-only encryption solutions.

The following description will begin with a discussion of TPMs. An architecture for DKM-based storage using a TPM will be explained, followed by description of a TPM-rooted key hierarchy for protecting access to DKM keys. Methods of implementing and using the key hierarchy in a DKM-TPM system will then be covered.

Figure 1:
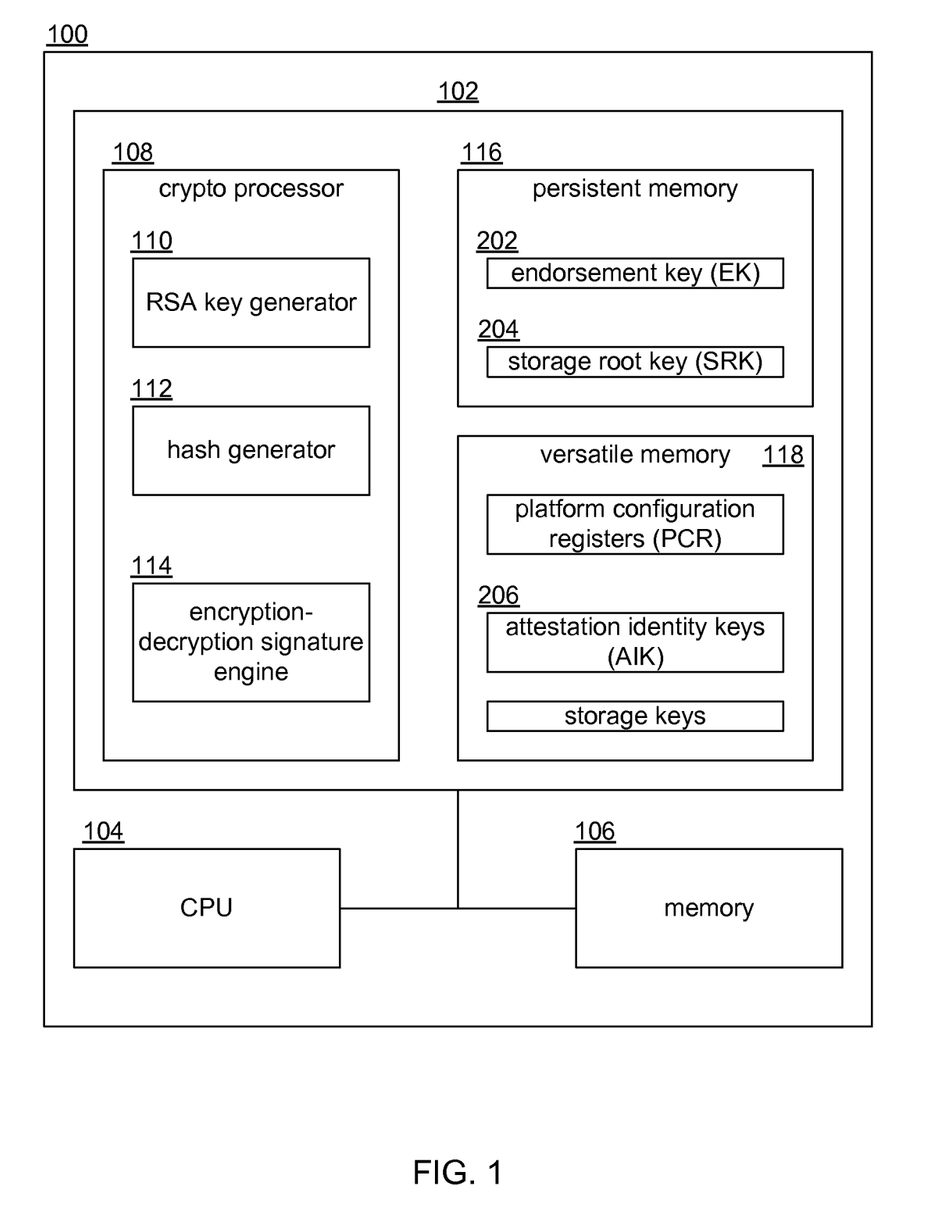
FIG. 1 shows a computer with a Trusted Platform Module (TPM).

FIG. 1 shows a computer 100 with a Trusted Platform Module (TPM) 102. The computer 100, whether a DKM client or DKM server, may be any device with a central processing unit (CPU) 104 and memory 106. The CPU 104, memory 106, and TPM 102 may exchange data via a data bus. DKM clients and DKM servers may exchange messages (for example, carrying a key payload) via a data network.

The TPM 102 may have been manufactured according to any past or future versions of the TPM Specification, which is published and available elsewhere. The TPM 102 is capable of both generating and storing cryptographic keys. The TPM 102 may also have functions for sealing, binding, measurement, and other functions, all described in detail elsewhere. A cryptographic processor 108 may have components such as a key generator 110 to generate public-private key pairs, a hash generator 112, and other components such as an encryption-decryption and signature engine 114. The TPM 102 also has non-volatile persistent memory 116 as well as dynamic versatile memory 118. The persistent memory 116 stores an endorsement key (EK) and a storage root key (SRK) (generated by a key generator 110), which may be burned into the TPM 102 at the time of production (when the TPM is manufactured). The versatile memory 118 stores platform configuration registers (PCR), attestation identity keys (AIK), storage keys, and the like.

Figure 2:
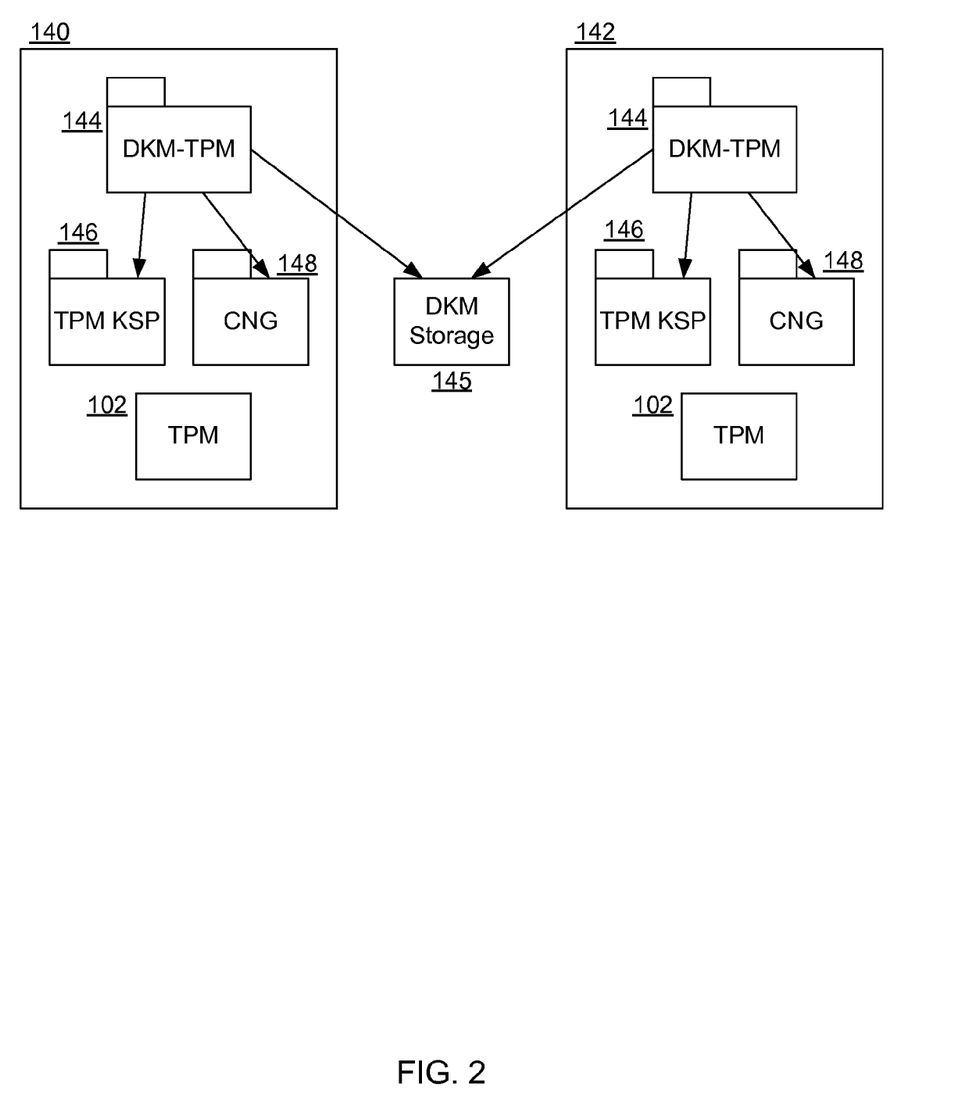
FIG. 2 shows a TPM-based DKM architecture.

FIG. 2 shows a TPM-based DKM architecture, to be referred to as DKM-TPM. Two client platforms 140 and 142 are shown. Each client platform 140, 142 has a DKM-TPM component 144 used to access DKM storage 145. The DKM-TPM component 144 may be a library, service, or other software that executes on the client platform (not in a local TPM), providing an API called by application software to perform security functions for securing data. A TPM on the client platform provides hardware-based security, and the DKM-TPM component 144 provides software-based security functions in conjunction with the TPM.

As will be explained, because some implementations of TPMs are slow (for instance, hundreds of milliseconds for cryptographic operations), the TPMs are used to safeguard distributed DKM keys (keys managed by a DKM service or system), and the DKM keys are then used for encrypting and decrypting user data. In other words, TPM devices on clients are used to protect DKM keys, and decrypted DKM keys are then stored in ordinary host memory, for instance memory 106, from where they are used by the host processor, for instance CPU 104, to perform encryption and decryption. In this way, a DKM key can be used by the relatively fast processor and memory of the DKM node. Moreover, after being initially generated and secured, a DKM key is present in clear form in the main memory of a DKM node that used its TPM to decrypt or unseal the DKM key only during the cryptographic operation. Over the long-term, DKM keys are stored in encrypted form as encrypted by TPM-based keys. Another performance enhancing but still secure approach is to have the operating system, such as Windows™, locally encrypt the TPM-decrypted DKM key while stored in main memory 106.

Returning to the client platform 140, 142, a cryptographic API (CAPI) module or a Cryptographic Next Generation (CNG) component 148 handles application level encryption and decryption (e.g., a DP API library). That is, cryptographic processing for DKM is done in software using CNG module 148 or the like. This may provide reasonable performance that is equivalent to a full-software solution such as DKM for Active Directory™ (DKM-AD). As mentioned, for some implementations, TPM-based cryptography has poor performance (several hundred milliseconds for a 2048-bit RSA private key operation) and may have incompatible padding formats. A key storage provider or a module with equivalent functionality (TPM KSP 146) is used to store keys outside the TSM. This embodiment does not assume or require the presence of a proper TPM KSP, but employs the TPM KSP concept when referring to the cryptographic functionality expected from a TPM.

The DKM storage 145 contains DKM group metadata such as group names, access control information, and cryptography policy, as well as DKM group data. Each DKM group contains group cryptographic policy and encrypted DKM group keys. In short, the DKM storage 145 is a shared resource (a server or a group of synchronized servers). Note that the DKM keys are conceptually encrypted with a key stored in TPM. In practice, there will be a key hierarchy, described later, in view of possible poor TPM cryptographic processing performance. An intermediate key will be sealed to a TPM key (which TPM key to use can vary), and the intermediate key will be used to encrypt DKM keys using the CNG component 148. Cryptographic operations with DKM keys will be carried out with CNG component 148. Note that the DKM storage 145 can be server-based, stored at DKM clients and DKM servers, or stored only by DKM clients in peer-to-peer fashion.

Figure 3:
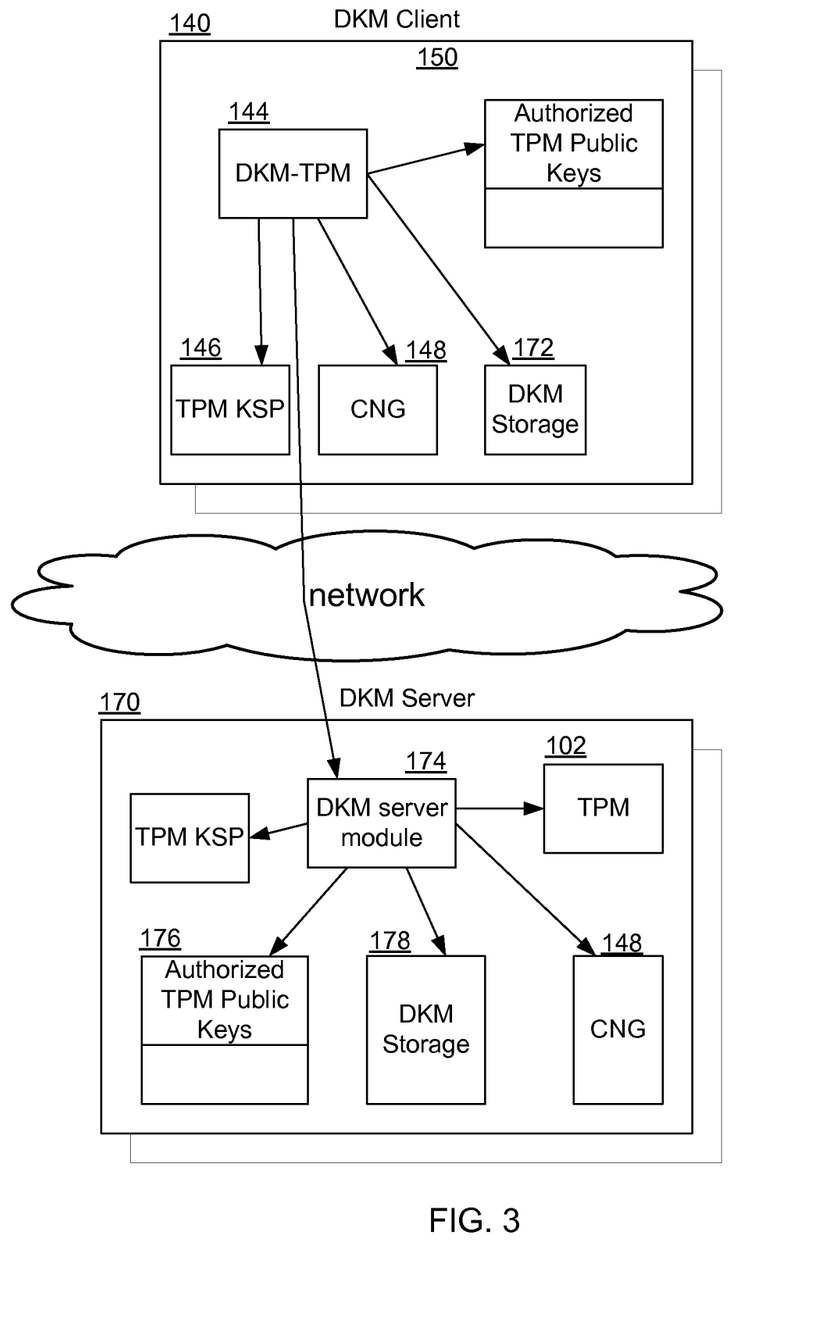
FIG. 3 shows a detailed DKM-TPM arrangement with DKM clients and a DKM server.

FIG. 3 shows a detailed DKM-TPM arrangement with DKM client platforms 140 and DKM server platforms 170. The DKM server 170 name (and names of any other servers) and access information are conveyed to DKM clients 140 during deployment or configuration. DKM servers maintain a list of all DKM servers; a client platform can retrieve a latest copy from a known DKM server. Each node—DKM client or DKM server—has a hierarchy as in FIG. 4. The DKM server 170 uses its TPM WK (wrapping key) to encrypt and its TPM SK (signing key) to sign DKM storage and message communications with DKM clients and other DKM servers.

A DKM client may also have a client DKM storage 172 to store TPM-encrypted DKM keys. The client DKM storage 172, storing encrypted DKM keys, may reside locally either in a persisted storage or in memory as a client-side cache. The client DKM storage 172 may not be relied on for long-term DKM key storage, but rather may be used as a local cache to reduce network communications and computation. Known cache maintenance algorithms may be used to purge stale data. This embodiment uses the local file system as DKM storage.

Long-term DKM storage is maintained on the DKM server 170. A DKM server component 174 handles communication with DKM clients. The TLS (transport layer security) protocol may be used by the client DKM-TMP 144 and the DKM server component 174 as an authentication protocol. The TLS protocol is used to create a mutually authenticated secure session using private keys and certificates rooted in their respective TPMs. For network communication, HTTPS (hypertext transport protocol secure) can be used as a network communication protocol data exchange between the client DKM-TPM 144 and the DKM server module 174. While HTTPS is convenient, any other communication protocol can be used. Instead of TLS, TPM keys may be used to secure the network payload between the client DKM-TPM 144 and the server DKM-TPM 174, or between DKM servers.

Note that because DKM keys are stored as encrypted by one or more TPM public keys 176, there is no confidentiality requirement for an external storage used to house DKM storage 178. The external storage is trusted to store the information a DKM server presents, and to return the complete information a DKM server requests. The external storage might be shared among multiple DKM servers.

If multiple DKM servers are used, a synchronization mechanism between DKM servers will be used. If the server storage (DKM storage 178) uses an external database, e.g., SQL Server™, the synchronization can be performed by that external storage. Where a DKM server is mentioned herein as storing a DKM key or the like, this is deemed to include both physical storage by the DKM server, as well as storage by accessing an external storage service such as a database, network file system, etc.

Figure 4:
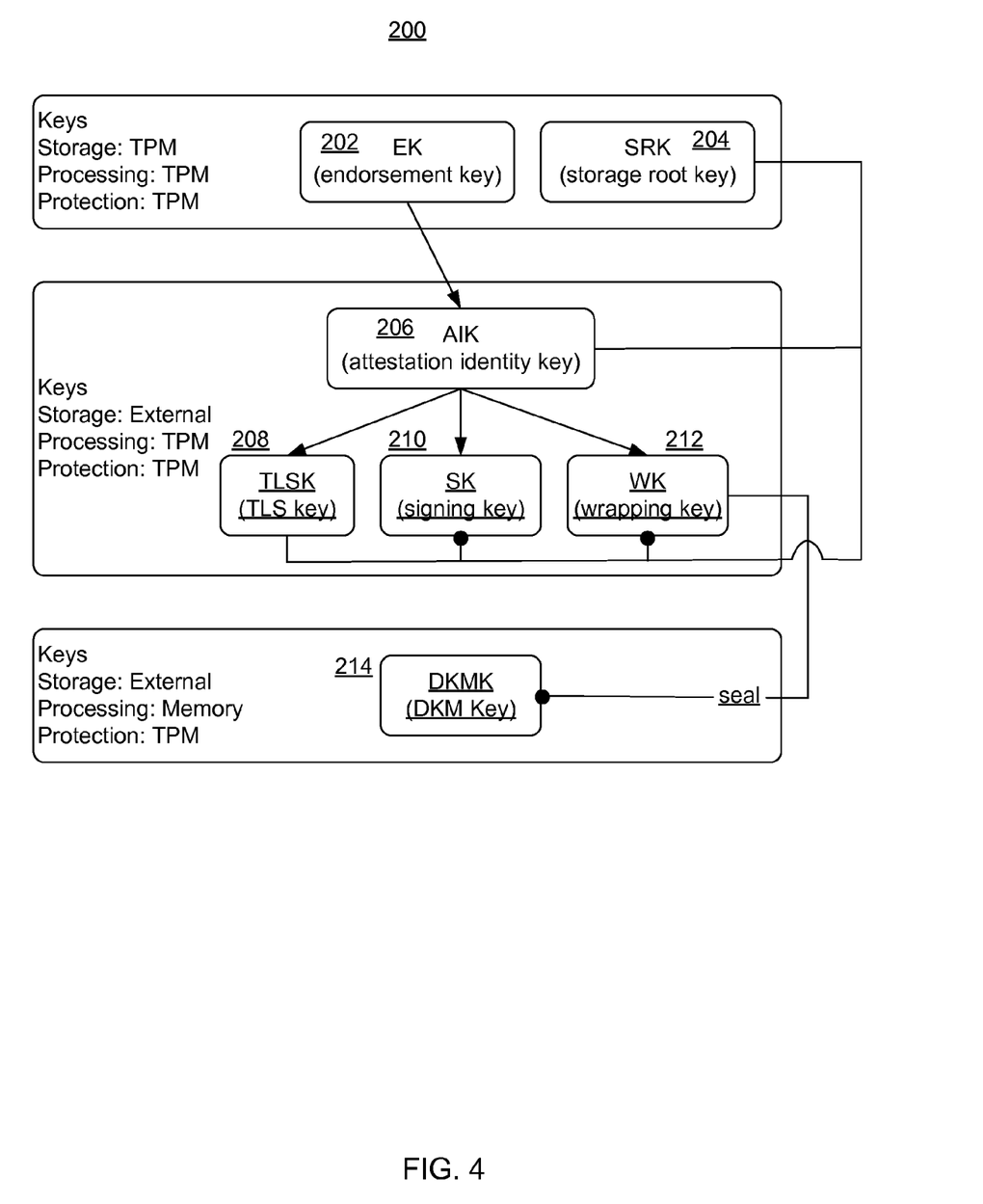
FIG. 4 shows a DKM-TPM key hierarchy 200.

FIG. 4 shows a DKM-TPM key hierarchy 200. The endorsement key (EK) 202, storage root key (SRK) 204, and attestation identity key (AIK) 206 are ordinary TPM key pairs (see FIG. 1). EK-pub (the public half of the EK 202) is the only key that must be known outside a TPM in order to make trust decisions. The EK-pub key forms the basis of trust for the key hierarchy 200. Note that the EK 202 is a "hard" key in TPM persistent memory (see the earlier discussion of TPMs).

A private TLS key (TLSK 208), signing key (SK 210), and wrapping key (WK 212) are protected by the SRK 204. These keys are stored in local file systems or other non-volatile storage and are loaded into a TPM as required. The corresponding public keys are signed by the AIK 206. This allows any machine, given EK-pub as the basis of trust, to validate AIK-pub, TLSK-pub, SK-pub, and WK-pub. The TLS key-pair is not essential for this embodiment, as explained above.

The DKM key (DKMK) 214 can be a symmetric key or a public-private key-pair. DKMK 214 contents are treated as an opaque blob by the TPM. Note that the DKMK 214 (private or secret) is encrypted with WK-pub (WK 212), and signed by SK-private when stored outside the DKM process/service and when transmitted over any network. The TPM protection of a DKMK is independent from security properties of the networking session through which it is transmitted. For instance, if there is a mutually authenticated TLS session based on TPM keys between two nodes, the DKMK is still encrypted and signed by WK-pub and SK-private. This separation allows off-TPM storage of DKMK (in-memory and on-disk key), and use of any network communication protocol.

Figure 5:
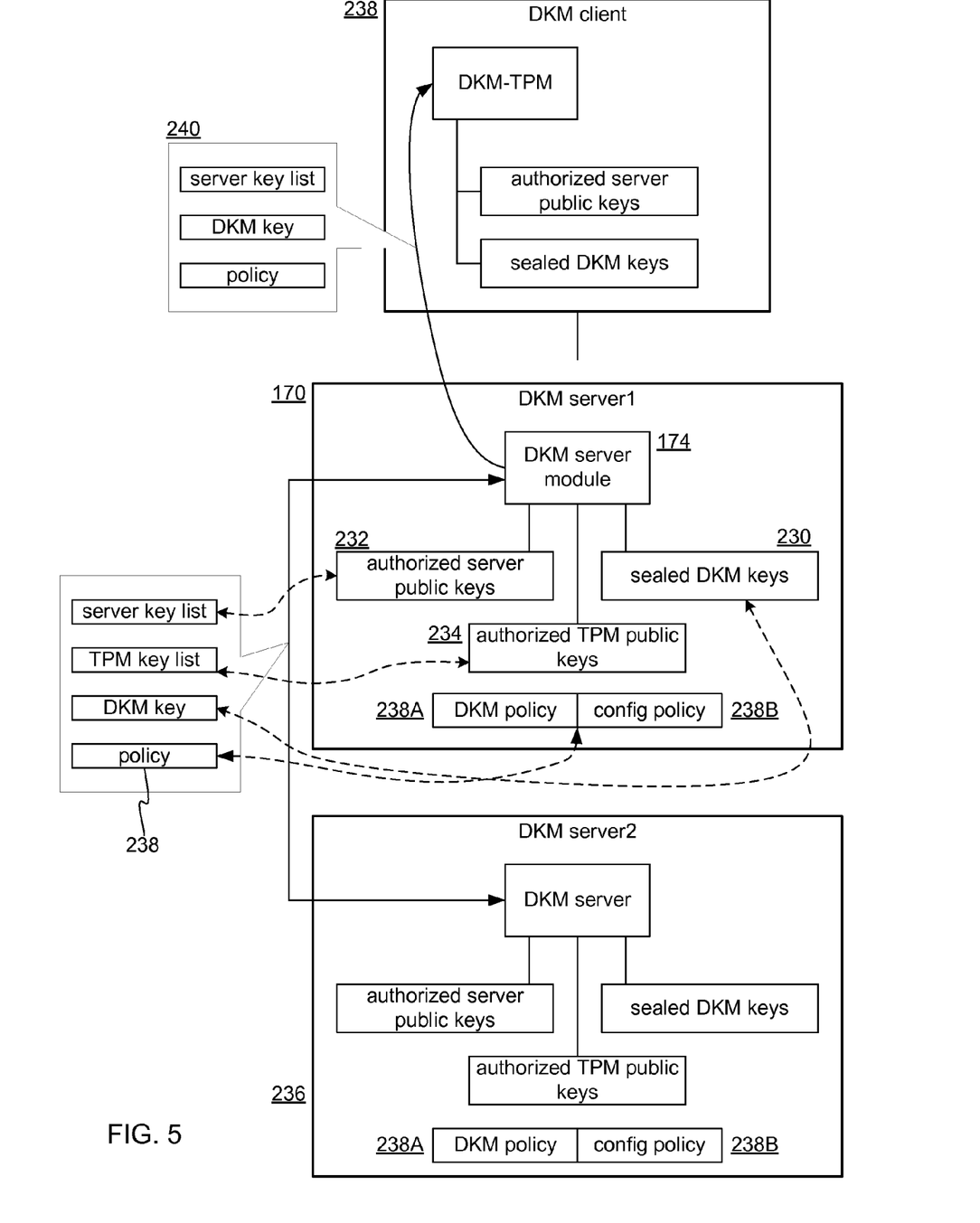
FIG. 5 shows lists of keys stored and exchanged between DKM servers and DKM clients.

FIG. 5 shows lists of keys stored and exchanged between DKM servers and DKM clients. In the following, "Ks" denotes a server TPM key pair, and "Kc" denotes a client TPM key pair. The DKM server 170 may store a list of DKM keys 230. Sign( ) and Unseal( ) operations use the private key, and Verify( ) and Seal( ) operations use the public key of a TPM key-pair. A DKM key therein may be understood as containing: $\text{Sign}_{Ks}((\text{Seal}_{Kc}(K)^*)$. In other words, the list of sealed DKM keys 230 is a list of signed and encrypted DKM keys, each encrypted with the corresponding TPM public key of the node it is stored on. The signature key (the key used for signing) is one of the private keys corresponding to one of the public keys in the authorized server key list 232.

The DKM server 170 also stores a list of authorized TPM public keys 234. Each entry is a signed public EK: $\text{Sign}_{Ks}$ (EK-pub). The list of authorized TPM public keys 234 is a list of signed TPM public keys (public EKs) that can acquire a DKM key. The signature key is one or more of the keys in the authorized server public key list 232. The authorized server public key list 232 also contains keys of the form: $\text{Sign}_{Ks}$(EK-pub). This list of signed TPM public keys (EK-pub) contains keys of hosts that can act as DKM servers. The signature key is one or more of the keys in the same authorized server public key list 232. Note that multiple DKM servers are not required. However, in a distributed embodiment, a second DKM server 236 may synchronize with the first DKM server 170 by exchanging the appropriate lists of keys, as well as corresponding group policies 238. Note also that a DKM client 238 may exchange, as needed, various DPM-TPM information 240, including sealed DKM keys, authorized server public keys, and policy. The policy may include DKM policy 238A as well as configuration policy 238B.

Regarding the authorized server public key list 232, this list constitutes the root of trust in the entire system. The list of authorized server public keys 232 is verified by one of the public keys in the same list. In effect, this is a distributed self-signed public key list, similar to the trusted roots in a traditional PKI (public key infrastructure) deployment. Typically, upon initial deployment, this list might have only a few (or just one) public key, signed by all the corresponding private keys, and the list is updated by an online synchronization protocol or other means. Note that clients would also need the same list, so the synchronization (or trusted root discovery) protocol may be the same between both client-server and server-server. Note also that this list is signed but not sealed. Thus, the entire list is portable across nodes and can be copied verbatim.

Regarding the root of trust, in another embodiment a small set of master servers as the root of trust. This master set uses one member's TPM signing keys to certify and authorize an 'authorized server (TPM) public keys' list and an 'authorized (client) TPM public keys' list. This option minimizes the root of trust to a small set of machines (rather than all servers) and complies with the separation-of-duties security design principle while maintaining flexibility of adding and removing DKM server and client machines.

Regarding the list of authorized TPM public keys 234, this list contains endorsement public keys that identify corresponding TPMs. The list is signed by one or more of the keys on the authorized server public key list 232. The authorized list of TPM public keys 234 is used by DKM servers to determine if a requesting DKM node (e.g., a DKM client or DKM server) is authorized to receive a particular DKM key. If the requestor's public key is in this list, the server responds back with the sealed blob of the requested DKM key with the requestor's TPM wrapping key, and signs the response with the server's private key. If a node is in the list of authorized server public keys 232, then the node does not need to be in the list of authorized TPM public keys 234. If a node is in the list of authorized TPM public keys 234, the node is authorized to receive DKM keys. This list of authorized TPM public keys 234 is signed but not sealed. Thus, the entire list is portable across nodes and can be copied verbatim.

Concerning the list of sealed DKM keys 230, the sealing is performed with the TPM wrapping key of the server storing the list. This prevents the list from being moved from one node to another, but in some implementations may require a formal distributed storage that provides fault tolerance. Thus, each server must have a local copy of the entire list of sealed DKM keys 230. The sealed key list can also be signed by one or more of the authorized server keys. However, since the list is sealed to one node, the additional signatures may be of little use. Thus, the sealed list can be signed with only the local node's TPM signing key. This ensures that when the list is read from a persisted storage, the list is not modified.

Figure 6:
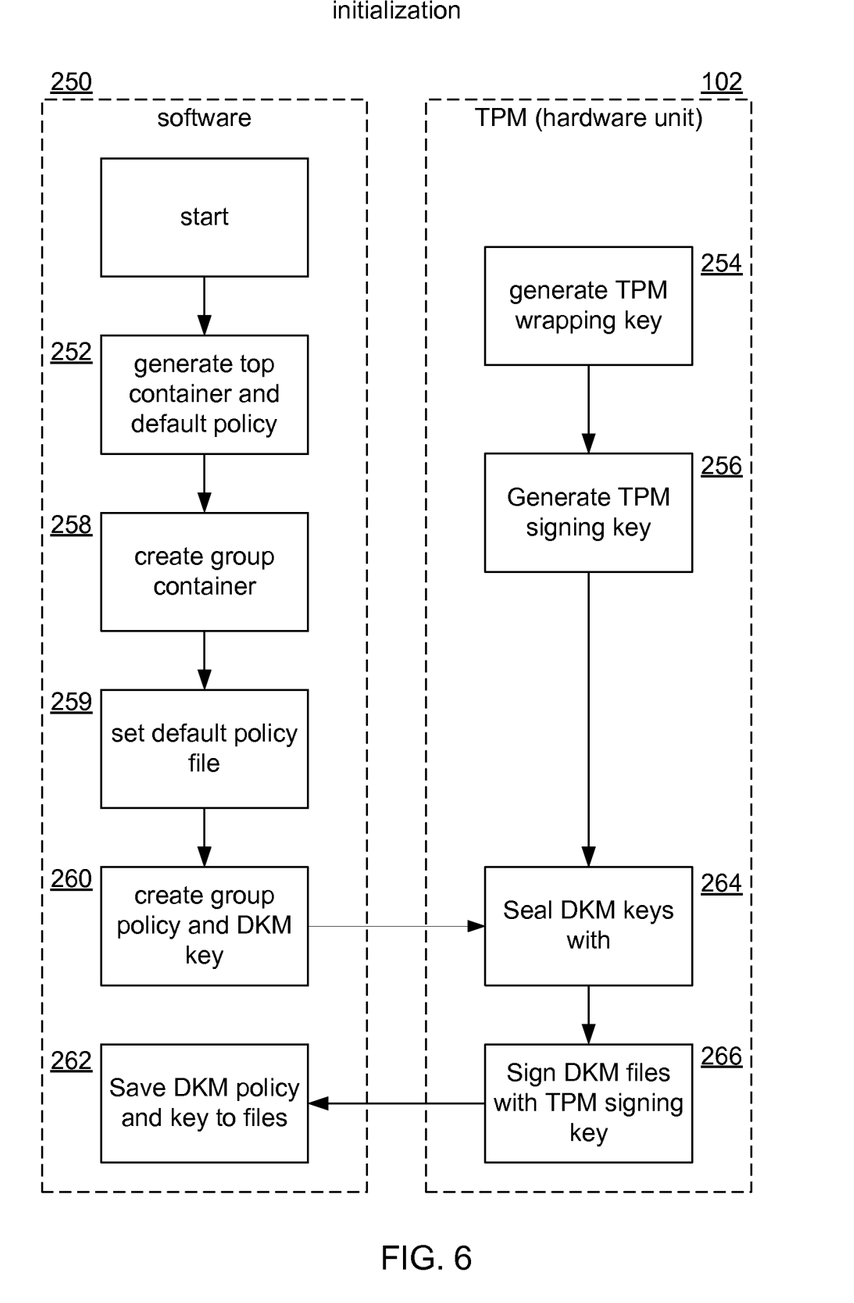
FIG. 6 shows an initialization process for initializing a group policy and corresponding DKM key secured by a TPM wrapping key.

FIG. 6 shows an initialization process for initializing a group policy and corresponding DKM key secured by a TPM wrapping key. Software 250 will perform some steps, and the TPM 102 will perform other steps. At step 252 a top container and default policy for a group are created by a client application invoking a function in the DKM-TPM component 140. At step 254 the TPM 102 generates a TPM wrapping key, and at step 256, the TPM 102 generates a TPM signature key. As mentioned above, these are public-private key pairs. The top container stores keys. In particular, the container stores DKM group keys, and policies that go with the DKM group keys. Regarding DKM groups, multiple non-overlapping groups may be provided, each with different set of keys and policies. One such approach is to have a set of lists for each DKM group.

At step 258, a group container is created with the default policy obtained from the DKM library and a default policy file from step 259, and at step 260 a group policy and DKM key are generated. The DKM policy contains the set of cryptographic algorithms DKM clients and servers use to protect data, the current DKM key to use in protect operations, and DKM key lifetime. The default DKM policy applies to all DKM groups; the default policy can be overridden by a DKM group policy. At step 262 the group policy is signed by the TPM signing key in step 266, and DKM keys are sealed and signed with the TPM wrapping and signing keys in steps 264 and 266, and then stored.

Figure 7:
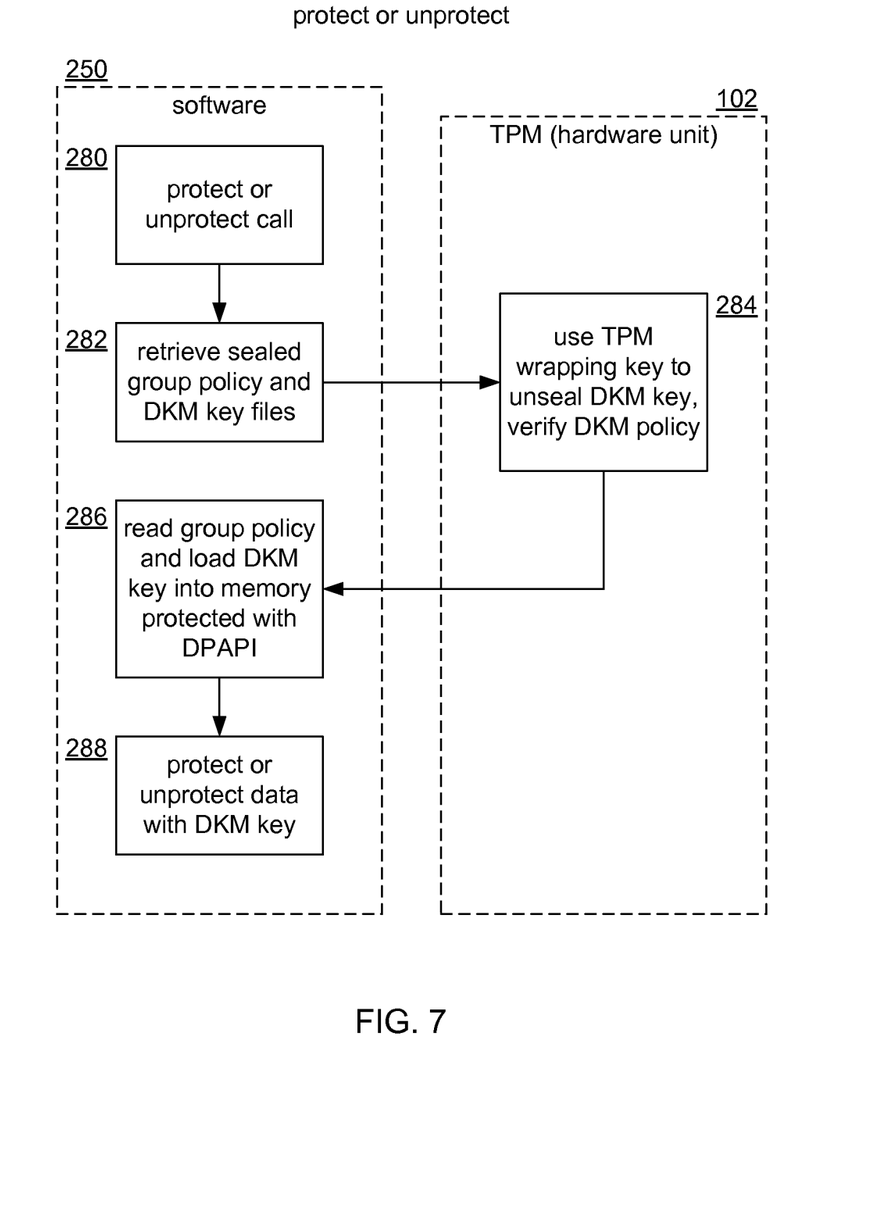
FIG. 7 shows a process to protect or unprotect data using a TPM.

FIG. 7 shows a process to protect or unprotect data. At step 280, a client issues, via its local DKM-TKM module 144, a protect or unprotect call specifying a group and data to be protected or unprotected. At step 282 the corresponding group policy is retrieved from local storage (e.g., from the local file system) and the signature on the group policy is verified. At step 284, the TPM 102 uses the corresponding TPM wrapping key to unseal the DKM key. This is passed to the software 250, and at step 286 the group policy is read to identify the needed DKM key, which is then loaded into memory. At step 288 the data is protected or unprotected (encrypted or decrypted) with the DKM key.

As used herein, "sealing" involves encryption and in addition specification of a state in which the TPM must be in order for the data to be decrypted (unsealed). That is, state of the computer that has the TPM may be hashed and stored in TPM registers (also called measurement).

Conclusion

Embodiments and features discussed above can be realized in the form of information stored in volatile or non-volatile computer or device readable media. This is deemed to include at least media such as optical storage (e.g., compact-disk read-only memory (CD-ROM)), magnetic media, flash read-only memory (ROM), or any current or future means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

What is claimed is:

1. A method of providing distributed key management (DKM) in a DKM system comprised of DKM client computers and a DKM server, each DKM client computer comprising a trusted platform module (TPM), the method comprising:
   sharing DKM keys among DKM clients, wherein TPMs of the DKM clients are used to decrypt the DKM keys with TPM private keys, and wherein software cryptography components are used to encrypt the DKM keys with TPM public keys, and wherein the DKM keys when not in use are stored as encrypted by the TPM public keys, and wherein the DKM keys, when decrypted, are used by the cryptography software components of the DKM clients to encrypt and decrypt data, and wherein the decrypted DKM keys are accessible in clear form in memory of the DKM clients during encryption or decryption operations that use the decrypted DKM keys;
   creating a default DKM policy that applies to a plurality of DKM groups of the DKM system, wherein the default DKM policy specifies a set of cryptographic algorithms to protect data, a current DKM key to use in protect operations, and a lifetime of the current DKM key; and
   overriding the default DKM policy of the plurality of DKM groups by a different DKM policy for a particular DKM group of the plurality of DKM groups.

2. A method according to claim 1, wherein the DKM keys are only accessible in clear form in memory of the DKM clients after having been decrypted by the TPMs.

3. A method according to claim 2, wherein the DKM keys are encrypted by encryption facilities executing in the memory outside any of the TPMs.

4. A method according to claim 1, wherein the method further comprises:
   receiving a request for a DKM key at the DKM server from a DKM client or from another DKM server; and
   determining, from a list of public TPM endorsement keys from the DKM clients and stored by the DKM server, that the DKM client is permitted to receive a DKM key requested from the DKM server by the DKM client.

5. A method according to claim 4, further comprising storing, by the DKM server, a list of public TPM keys of DKM servers obtained from TPMs of the DKM servers, respectively, the list including a TPM key of the DKM server that signed the list and which can be used to verify the list.

6. A method according to claim 1, further comprising sealing a DKM key with wrapping key of a DKM client or DKM server, and signing a DKM policy with a signing key of the DKM client or DKM server, the wrapping key having been generated by a TPM of the DKM client or DKM server, the signing key having been generated by a TPM of the DKM client or DKM server, and the wrapping key having been sealed by a storage root key.

7. One or more computer-readable storage devices storing information to configure a computer to perform a process and operate as a distributed key management (DKM) client in a DKM system in which DKM clients use trusted platform modules (TPM) respectively thereon to secure DKM keys distributed to the DKM clients by a DKM server, the process comprising:
   storing, on the DKM server, a list of public endorsement keys, each of the public endorsement keys identifying a corresponding TPM;
   responsive to a call to protect or unprotect data on a DKM client, retrieving a group policy from local storage of the DKM client;
   verifying a signature on the group policy;
   using, by the TPM of the DKM client, a TPM wrapping key of the DKM client to unseal the sealed DKM key;
   reading the verified group policy to identify the unsealed DKM key and loading the unsealed DKM key into memory of the DKM client, wherein the memory is not part of the TPM of the DKM client;
   executing a decryption process by a processor of the DKM client, wherein the decryption process uses the unsealed DKM key in the memory to encrypt or decrypt user data specified by the call, and wherein the unsealed DKM keys are accessible in clear form in the memory only during the encryption or the decryption of the user data specified by the call, and wherein the processor is not part of the TPM of the DKM client;
   creating a default DKM policy that applies to a plurality of DKM groups of the DKM system, wherein the default DKM policy specifies a set of cryptographic algorithms to protect data, a current DKM key to use in protect operations, and a lifetime of the current DKM key; and
   overriding the default DKM policy of the plurality of DKM groups by a different DKM policy for a particular DKM group of the plurality of DKM groups.

8. One or more computer-readable storage devices according to claim 7, the process further comprising: prior to the call of the DKM client: in response to a request by the DKM client, generating the TPM wrapping key by the TPM of the DKM client, and sealing the group policy and DKM key by the TPM of the DKM client using the TPM wrapping key.

9. One or more computer-readable storage devices according to claim 8, the process further comprising: responding to the request by the DKM client by selecting the sealed DKM key and group policy from a list of sealed DKM keys stored by the DKM server.

10. One or more computer-readable storage devices according to claim 9, wherein the DKM server and a plurality of additional DKM servers each store a local copy of a list of sealed DKM keys used by the DKM system.

11. One or more computer-readable storage devices according to claim 10, the process further comprising granting access to the sealed DKM key by determining that the public endorsement key of the DKM client is present in the list of public endorsement keys.

12. One or more computer-readable storage devices according to claim 7, the process further comprising generating the DKM key in software not executing in a TPM.

13. One or more computer-readable storage devices according to claim 7, the process further comprising storing a list of public keys of DKM servers, wherein the list is signed by a private key of the DKM server and verifiable on the DKM client using a public key of the DKM server.

14. One or more computer-readable storage devices according to claim 7, further comprising using an attestation key in the TPM of the DKM client to verify the DKM wrapping key before unsealing the DKM key.

15. A method performed by distributed key management (DKM) node participating in a DKM system, the DKM node comprising a processor memory together executing a DKM module, the DKM node further comprising a trusted platform module (TPM) having a cryptographic processor, persistent memory, and versatile memory, the method comprising:
   using TPM keys provided by TPMs of DKM clients to sign and encrypt DKM keys, and allowing the encrypted DKM keys to be distributed by the DKM system, wherein a default DKM policy applies to a plurality of DKM groups of the DKM system, the default DKM policy specifying a set of cryptographic algorithms to protect data, a current DKM key to use in protect operations, and a lifetime of the current DKM key;
   overriding the default DKM policy of the plurality of DKM groups by a different DKM policy for a particular DKM group of the plurality of DKM groups;
   using the TPMs of the DKM clients to verify and decrypt the signed and encrypted DKM keys; and
   encrypting and decrypting user data by the DKM modules of the DKM clients using the decrypted DKM keys, wherein the decrypted DKM keys are only accessible in clear form in memory of the DKM node when the decrypted DKM keys are used for the encryption and the decryption of the user data.

16. A method according to claim 15, wherein the verifying and decrypting is performed by the TPMs by using endorsement keys hard-stored in the TPMs to decrypt attestation identity keys.

17. A method according to claim 16, further comprising generating and storing the attestation identity keys by the TPMs, respectively, wherein the attestation identity keys sign corresponding public wrapping keys that are generated and stored by corresponding TPMs.

18. A method according to claim 15, further comprising storing, on a DKM server, a list of public endorsement keys, each of the public endorsement keys identifying a TPM that corresponds to the particular public endorsement key, wherein the list of public endorsement keys identifies a plurality of the TPMs and is signed but not sealed.

19. A method according to claim 15, wherein the TPM keys comprise endorsement keys that are set in permanent storage of the TPMs when the TPMs are manufactured.

20. A method according to claim 19, wherein the TPM keys further comprise storage root keys, signing keys, and wrapping keys, wherein the storage root keys encrypt the wrapping keys and signing keys, and the signing keys and wrapping keys sign and seal the DKM keys.

* * * * *